United States Patent Office 3,850,883
Patented Nov. 26, 1974

3,850,883
POLYOLEFIN COMPOSITION STABILIZED
AGAINST METAL-INDUCED OXIDATION
Mitsuo Masaki, Satoshi Matsunami, Toshio Yoshikawa, and Nagayoshi Sakamoto, Ichihara, Japan, assignors to Ube Industries, Ltd.
No Drawing. Filed Feb. 7, 1974, Ser. No. 440,313
Claims priority, application Japan, Aug. 24, 1973, 48/94,307
Int. Cl. C08f 45/62
U.S. Cl. 260—45.75 K     13 Claims

ABSTRACT OF THE DISCLOSURE

A stabilized polyolefin composition having resistance against deterioration caused by contact with heavy metals which comprise pyridinethiol-tin compound having the formula of RS-SnX$_2$-SR' in which R and R' are groups derived from unsubstituted or substituted pyridines or unsubstituted or substituted pyridine N-oxides.

---

This invention relates to a stabilized polyolefin composition and particularly to a polyolefin composition having resistance against deterioration caused by contact with heavy metals.

Heretofore, such polyolefins as polyethylene, polypropylene, polybutene and the like have been employed in the wide field owing to their excellent physical or chemical characteristics. However, as is commonly known, if a polyolefin is employed with no additives, it will be deteriorated by heat, light or oxygen during processing or with use. In order to prevent its deterioration, several kinds of anti-oxidizing agents have been develop and employed.

Yet, in cases where polyolefins cannot be kept from contact with such heavy metals as copper, iron, nickel and the like, for instance, in cases of covering polyolefin over copper wire, plating polyolefin with heavy metals, coloring polyolefin by pigments containing heavy metals and the like, the use of the aforementioned general anti-oxidizing agents can hardly bring about resistance against deterioration caused by contact with heavy metals.

Further, if liquid amorphous polyolefin may possibly be in contact with copper, for instance, if liquid amorphous polyolefin is employed as a insulating oil for a cable, there is required resistance against deterioration caused by contact with copper. Yet, the aforementioned general anti-oxidizing agents cannot meet the above requirement.

For the above reason, such anti-deteriorating agents as MARK-CDA-1 (Adeka-Argus Chemical Industry Co., Ltd.), N,N'-dibenzylideneoxalic acid dihydrazide, N-salicylidenesalicyclic acid hydrazide and the like have been developed and broadly employed for the purpose of giving polyolefin resistance against deterioration caused by contact with heavy metals. Nevertheless, these agents cannot be mentioned as agents satisfying the requirement of anti-deteriorating effect.

Therefore, the object of this invention is to provide a polyolefin composition having excellent resistance against deterioration caused by contact with heavy metals. The further object is to provide a stabilized polyolefin composition which can be employed especially for covering of copper wire. Another object of this invention is to provide a liquid amorphous polyolefin composition having excellent resistance against said deterioration. Other objects of this invention will be obvious from the contents of the specification hereinafter disclosed.

The present inventors have found that the following polyolefin composition is stabilized against deterioration and particularly against deterioration caused by contact with heavy metals, and achieved with the present invention. The said composition is one which comprises 100 weight parts of polyolefin and 0.001~5 weight parts of a compound (anti-deteriorating agent) having the general formula

wherein each of R and R' represents a group which is selected from the class consisting of groups having the general formulae

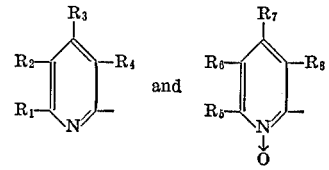

wherein each of R$_1$–R$_8$ represents a group which is selected from the class consisting of hydrogen atom, a halogen atom, nitro group, nitroso group, an amino group, cyano group, carboxyl group, a carbamoyl group, a thiocarbamoyl group, an alkoxycarbonyl group having carbon atoms of 2–11, hydroxyl group, a hydrazinocarbonyl group, mercapto group, acyloxy, alkoxy and acylamino groups each having carbon atoms of 1–10 and a group selected from the class consisting of phenyl group and the substituted group thereof, linear and branched alkyl groups each having carbon atoms of 1–12 and the substituted groups thereof, linear and branched alkenyl groups each having carbon atoms of 2–12 and the substituted groups thereof and aralkyl and alkallyl groups each having carbon atoms of 7–12 and the substituted groups thereof wherein the substituents in the substituted groups are groups selected from the class consisting of a halogen atom and the above-mentioned groups, and not less than two groups among each of R$_1$–R$_4$ and R$_5$–R$_8$ represent groups selected from the class consisting of hydrogen atom and unsubstituted linear and branched alkyl groups each having carbon atoms of 1–12, and X represents a halogen atom.

Polyolefins of the composition according to this invention may be exemplified by amorphous, crystalline or liquid homopolymers or copolymers of olefins such as, for instance, ethylene, propylene, butene-1, isobutene, pentene-1 and 4-methylpentene-1, copolymers of these olefins an alkylester of an unsaturated carboxylic acid such as, for instance, methyl acrylate, ethyl acrylate and ethyl methacrylate or a vinylester of saturated carboxylic acid such as, for instance, vinyl acetate, and mixtures of these polymers.

The anti-deteriorating agent having the aforementioned general formula (1) can be synthesized by the reaction of 2,2'-dipyridyl disulfide or a 2,2'-bis(N-oxidopyridyl) disulfide with stannous halide in the presence or absence of an organic solvent. The reaction formula is as follows.

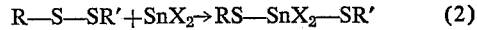

In this formula, R, R' and X are the same as above. R and R' of the above-mentioned 2,2'-dipyridyl disulfides are concretely exemplified by 2-pyridyl groups, 3-nitro-2-pyridyl groups,
5-nitro-2-pyridyl groups,
3-nitro-5-methyl-2-pyridyl groups,
3-chloro-5-nitro-2-pyridyl groups,
3-bromo-5-nitro-2-pyridyl groups,
3-iodo-5-nitro-2-pyridiyl groups,
3-nitro-5-acetamido-2-pyridyl groups,
3-nitro-5-amino-2-pyridyl groups,
5-cyano-2-pyridyl groups,
3-cyano-6-undecanyl-2-pyridyl groups,
3-cyano-4,6-dimethyl-2-pyridyl groups,
3-cyano-4-ethoxycarbonyl-6-methyl-2-pyridyl groups,
3-cyano-4-methyl-6-phenyl-2-pyridyl groups, 3-cyano-4,6-dimethyl-5-acetyloxy-2-pyridyl groups,
3-cyano-6-methyl-2-pyridyl groups,
3-cyano-4,6-dimethyl-5-amino-2-pyridyl groups,
5-acetamido-2-pyridyl groups,
3-acetamido-6-chloro-2-pyridyl groups,
3-amino-6-methoxy-2-pyridyl groups,
3-amino-6-ethoxy-2-pyridyl groups,
5-amino-2-pyridyl groups,
3-amino-6-chloro-2-pyridyl groups,
3-amino-2-pyridyl groups,
3-hydrazinocarbonyl-2-pyridyl groups,
5-carbamoyl-2-pyridyl groups,
5-thiocarbamoyl-2-pyridyl groups,
3-chloro-5-thiocarbamoyl-2-pyridyl groups,
3-bromo-5-thiocarbamoyl-2-pyridyl groups,
3-iodo-5-thiocarbamoyl-2-pyridyl groups,
3-methoxycarbonyl-2-pyridyl groups,
4-methoxycarbonyl-6-mercapto-2-pyridyl groups,
3-ethoxycarbonyl-6-methyl-2-pyridyl groups,
3-carboxy-4-mercapto-2-pyridyl groups,
3-carboxy-2-pyridyl groups,
3-chloro-5-carboxy-2-pyridyl groups,
3-bromo-5-carboxy-2-pyridyl groups,
3-iodo-5-carboxy-2-pyridyl groups,
3-carboxy-4,6-dimethyl-2-pyridyl groups,
5-chloro-2-pyridyl groups,
5-bromo-2-pyridyl groups,
5-iodo-2-pyridyl groups,
3,5-dibromo-2-pyridyl groups,
3,5-diiodo-2-pyridyl groups,
3-methyl-2-pyridyl groups,
4-methyl-2-pyridyl groups,
5-methyl-2-pyridyl groups,
6-methyl-2-pyridyl groups,
3-ethyl-6-methyl-2-pyridyl groups,
4,6-dimethyl-2-pyridyl groups,
5,6-dimethyl-2-pyridyl groups,
4,6-diethyl-2-pyridyl groups,
4-ethyl-5,6-dimethyl-2-pyridyl groups,
5-ethyl-4,6-dimethyl-2-pyridyl groups,
4-ethyl-3,5,6-trimethyl-2-pyridyl groups,
3-phenyl-2-pyridyl groups,
4-methyl-6-phenyl-2-pyridyl groups,
4-methyl-6-*para*-toyl-2-pyridyl groups,
4,6-diphenyl-2-pyridyl groups,
N-oxido-2-pyridyl groups,
N-oxido-5-bromo-2-pyridyl groups,
N-oxido-6-chloro-2-pyridyl groups,
N-oxido-4-nitro-2-pyridyl groups,
N-oxido-3-methyl-2-pyridyl groups,
N-oxido-6-methyl-2-pyridyl groups,
N-oxido-4-propyl-2-pyridyl groups,
N-oxido-3-ethyl-6-methyl-2-pyridyl groups,
N-oxido-4,6-dimethyl-2-pyridyl groups,
N-oxido-4,5-dimethyl-2-pyridyl groups,
N-oxido-4-methyl-2-pyridyl groups,
N-oxido-3,4-dimethyl-2-pyridyl groups and
N-oxido-5-methyl-2-pyridyl groups.

Further, X may be fluorine, chlorine, bromine or iodine.

The organic solvent employed in the reaction may be exemplified by an aliphatic or alicyclic hydrocarbon such as, for instance, pentane, hexane, heptane, cyclohexane or ligroin, an aromatic hydrocarbon or its halogenated derivative such as, for instance, benzene, toluene, xylene or chlorobenzene, a halogenated hydrocarbon such as, for instance, chloroform, methylene chloride, carbon tetrachloride or ethylene dichloride, an alcohol such as, for instance, methanol, ethanol, propanol, cyclohexanol, ethylene glycol or diethylene glycol, and a ketone such as, for instance, acetone, methyl ethyl ketone or methyl isobutyl ketone. Of these organic solvents those in which the aforementioned disulfide is soluble are preferred.

If a substance which can react with stannous halide to give a complex compound soluble in the aforementioned organic solvent, such as an organic Lewis base, for example, dioxane, tetrahydrofuran, diethyl ether, dipropyl ether, dibutyl ether, diethylene glycol dimethyl ether, N,N-dimethylformamide, caprolactam, dimethyl sulfoxide or triphenylphosphine oxide is used as an additive in the reaction represented by aforementioned formula (2), the reaction may be promoted and separation of a solid reaction product from unreacted stannous halide becomes easy. The amount of the organic Lewis base to be added may be between a small amount such as 0.01 mole to 1 mole of stannous halide and such a large amount that said base itself may serve as a solvent. In case where the organic Lewis base is employed in a small amount, said base forms a complex compound with a part of the stannous halide. The stannous halide reacts in the form of a complex, and then an organic Lewis base liberated by the reaction again forms a complex compound with an another part of the stannous halide.

The reaction temperature and time to be employed may vary upon, for example, the kind of the aforementioned disulfide and/or the kind and/or a reacting amount of stannous halide. The reaction temperature is set below the decomposition temperature of the above disulfide and may generally be between 0 and 150° C. The reaction time may generally be between 10 minutes and 12 hours.

The separation of the anti-oxidizing agent of the present invention, a reaction product, from the reaction mixture may be carried out by filtration of the reaction mixture and subsequent washing and/or recrystallization of the collected residue using cooled water or an organic solvent such as, methylene chloride, ethylene dichloride, carbon tetrachloride, acetonitrile, benzene, xylene, toluene, etc. or alternatively extraction of the collected residue with, for example, hot benzene, hot toluene or hot acetonitrile.

The anti-oxidizing agent of the present invention may concretely be exemplified by dichloro bis(2-pyridylthio)tin(IV),
dibromo bis(2-pyridylthio)tin(IV),
diiodo bis(2-pyridylthio)tin(IV),
difluoro bis(2-pyridylthio)tin(IV),
dichloro bis(N-oxido-2-pyridylthio)tin(IV),
dibromo bis(N-oxido-2-pyridylthio)tin(IV),
diiodo bis(N-oxido-2-pyridylthio)tin(IV),
difluoro bis(N-oxido-2-pyridylthio)tin(IV),
dichloro bis(3-nitro-2-pyridylthio)tin(IV),
dichloro bis(5-nitro-2-pyridylthio)tin(IV),
dichloro bis(3-nitro-5-methyl-2-pyridylthio)tin(IV),
dichloro bis(3-chloro-5-nitro-2-pyridylthio)tin(IV),
dichloro bis(3-cyano-4,6-dimethyl-2-pyridylthio)tin(IV),
dibromo bis(3-cyano-4,6-dimethyl-2-pyridylthio)tin(IV),
diiodo bis(3-cyano-4,6-dimethyl-2-pyridylthio)tin(IV),
difluoro bis(3-cyano-4,6-dimethyl-2-pyridylthio)tin(IV),
dichloro bis(3-cyano-4-methyl-6-phenyl-2-pyridylthio)tin(IV),
dibromo bis(3-cyano-4-methyl-6-phenyl-2-pyridylthio)tin(IV),
diiodo bis(3-cyano-4-methyl-6-phenyl-2-pyridylthio)tin(IV),
difluoro bis(3-cyano-4-methyl-6-phenyl-2-pyridylthio)tin(IV),
dichloro bis(3-cyano-6-methyl-2-pyridylthio)tin(IV),
dibromo bis(3-cyano-6-methyl-2-pyridylthio)tin(IV),
diiodo bis(3-cyano-6-methyl-2-pyridylthio)tin(IV),
difluoro bis(3-cyano-6-methyl-2-pyridylthio)tin(IV),
dichloro bis(5-acetamido-2-pyridylthio)tin(IV),
dichloro bis(3-acetamido-6-chloro-2-pyridylthio)tin(IV),
dichloro bis(3-amino-6-chloro-2-pyridylthio)tin(IV),
dichloro bis(3-ethoxycarbonyl-6-methyl-2-pyridylthio)tin(IV),
dichloro bis(5-chloro-2-pyridylthio)tin(IV),
dichloro bis(5-bromo-2-pyridylthio)tin(IV),
dichloro bis(4,6-dimethyl-2-pyridylthio)tin(IV),
dichloro bis(4,6-diethyl-2-pyridylthio)tin(IV),
dibromo bis(4,6-dimethyl-2-pyridylthio)tin(IV),
dibromo bis(4,6-diethyl-2-pyridylthio)tin(IV),
diiodo bis(4,6-dimethyl-2-pyridylthio)tin(IV), difluoro bis(4,6-dimethyl-2-pyridylthio)tin(IV),
dichloro bis(6-methyl-2-pyridylthio)tin(IV),
dibromo bis(6-methyl-2-pyridylthio)tin(IV),
diiodo bis(6-methyl-2-pyridylthio)tin(IV),
difluoro bis(6-methyl-2-pyridylthio)tin(IV),
dichloro bis(3-ethyl-6-methyl-2-pyridylthio)tin(IV),
dichloro bis(4-methyl-6-phenyl-2-pyridylthio)tin(IV),
dibromo bis(4-methyl-6-phenyl-2-pyridylthio)tin(IV),
diiodo bis(4-methyl-6-phenyl-2-pyridylthio)tin(IV),
difluoro bis(4-methyl-6-phenyl-2-pyridylthio)tin(IV),
dichloro (6-methyl-2-pyridylthio)(2'-pyridylthio)tin(IV),
dichloro (4,6-dimethyl-2-pyridylthio)(2'-pyridylthio)tin(IV),
dichloro bis(3-methyl-2-pyridylthio)tin(IV),
dichloro bis(4-methyl-2-pyridylthio)tin(IV),
dichloro bis(5-methyl-2-pyridylthio)tin(IV),
dichloro bis(5-iodo-2-pyridylthio)tin(IV),
dichloro bis(3-phenyl-2-pyridylthio)tin(IV),
dichloro bis(5,6-dimethyl-2-pyridylthio)tin(IV),
dichloro bis(4-methyl-6-*para*-tolyl-2-pyridylthio)tin(IV),
dichloro bis(4,6-diphenyl-2-pyridylthio)tin(IV),
dichloro bis(4-ethyl-5,6-dimethyl-2-pyridylthio)tin(IV),
dichloro bis(4,6-dimethyl-5-ethyl-2-pyridylthio)tin(IV),
dichloro bis(3,5,6-trimethyl-4-ethyl-2-pyridylthio)tin(IV),
dichloro (4-methyl-6-phenyl-2-pyridylthio)(2'-pyridylthio)tin(IV),
dichloro bis(N-oxido-4-nitro-2-pyridylthio)tin(IV),
dichloro bis(N-oxido-6-chloro-2-pyridylthio)tin(IV),
dichloro (N-oxido-2-pyridylthio)(2'-pyridylthio)tin(IV),
dichloro (N-oxido-2-pyridylthio)(4',6'-dimethyl-2'-pyridylthio)tin(IV),
dichloro bis(N-oxido-5-bromo-2-pyridylthio)tin(IV),
dichloro bis(N-oxido-4-propyl-2-pyridylthio)tin(IV),
dichloro bis(N-oxido-3-methyl-2-pyridylthio)tin(IV),
dichloro bis(N-oxido-6-methyl-2-pyridylthio)tin(IV),
dichloro (N-oxido-4,6-dimethyl-2-pyridylthio)(2'-pyridylthio)tin(IV),
dichloro (N-oxido-6-chloro-2-pyridylthio)(4',6'-dimethyl-2'-pyridylthio)tin(IV),
dichloro bis(N-oxido-3-ethyl-6-methyl-2-pyridylthio)tin(IV),
dichloro bis(N-oxido-4,6-dimethyl-2-pyridylthio)tin(IV),
dichloro bis(N-oxido-4-methyl-2-pyridylthio)tin(IV),
dichloro bis(N-oxido-5-methyl-2-pyridylthio)tin(IV),
dichloro bis(N-oxido-3,4-dimethyl-2-pyridylthio)tin(IV) and
dichloro bis(N-oxido-4,5-dimethyl-2-pyridylthio)tin(IV).

In the composition of the present invention, an amount of mixing or compounding of the anti-deteriorating agent is between 0.001~5 parts, preferably 0.01~3 parts, to 100 parts of polyolefin by weight. An amount of mixing or compounding less than the above-mentioned 0.001 weight part cannot show enough anti-deteriorating effect and an amount of mixing or compounding more than 5 weight parts cannot show further anti-deteriorating effect.

Every process adequate for preparation of a homogeneous composition may be adopted to a process for mixing or compounding of the aforesaid anti-deteriorating agent into a polyolefin, for example, a process which comprises dissolving the anti-deteriorating agent in a low-boiling solvent, mixing the solution with polyolefin and removing the solvent by evaporation, a process which comprises heating polyolefin above its melting point and then mixing the anti-deteriorating agent therewith, or a process which comprises mixing polyolefin with the anti-deteriorating agent by means of one of mixers.

In addition, the anti-deteriorating agent used in the present invention may be employed together with a publicly known stabilizing agent, dispersing agent, plasticizer, anti-static agent, filler or pigment.

Synthesis examples of the anti-deteriorating agent will be shown below.

SYNTHESIS EXAMPLE I

Synthesis of dichloro bis(2-pyridylthio)tin(IV)

To 150 ml. of benzene were added 33.95 g. of ε-caprolactam and 28.44 g. of stannous chloride. They were mixed until dissolved. To the solution was added dropwise with stirring at room temperature a solution of 33.05 g. of 2,2'-dipyridyl disulfide in 150 ml. of benzene. With addition, pale yellow crystals precipitated. After completion of the addition, the resultant mixture was stirred at room temperature for 3 hours and filtered. Crystals collected by the filtration were suspended in 350 ml. of ethylene dichloride. After stirring, the suspended crystals were collected by filtration. The collected crystals were washed with 50 ml. of ethylene dichloride and then with 100 ml. of benzene and dried to give 57.27 g. of almost colorless crystals with slight yellowness, melting at 275–277° C.

The elemental analytical results of these crystals are shown below.

Found: C, 29.32%; H, 1.92%; N, 6.78%; S, 15.90%; Cl, 17.56%. Calcd. for $C_{10}H_8N_2S_2SnCl_2$: C, 29.30%; H, 1.97%; N, 6.83%; S, 15.64%; Cl, 17.30%.

The obtained crystals showed a parent peak at 410 in Mass Spectra. This result exhibits that said crystals have molecular weight of 410 and therefore, the obtained crystals evidently have a molecular formula of $$C_{10}H_8N_2S_2SnCl_2$$

on the basis of the above elemental analytical results.

In order to confirm that the obtained crystals should be identified as dichloro bis(2-pyridylthio)tin(IV), the following experiments were carried out.

Dichloro bis(2-pyridylthio)tin(IV) was synthesized from several kinds of tetracovalent chlorotin compounds according to three other methods shown below.

(a) Dichloro bis(acetalacetonate)tin(IV), which was a known compound, and double molar quantity of 2-pyridinethiol were caused to react in an organic solvent at room temperature to give dichloro bis(2-pyridiylthio)tin(IV) in a yield of 93.7% as well as acetylacetone. (Refer to Referential Example 1).

(b) 2-Pyridinethiol and 0.5 times molar quantity of stannic chloride were caused to react in water to give dichloro bis(2-pyridylthio)tin(IV) in a yield of 90.4%. (Refer to Referential Example 2).

(c) 2-Pyridinethiol-stannic chloride complex (2:1 in molar ratio) which was prepared by reaction of 2-pyridinethiol and 0.5 times the molar quantity of stannic chloride in an organic solvent under nonaqueous conditions (Refer to Referential Example 3) was caused to react with triethylenediamine (a strong organic base) in an organic solvent to give dichloro bis(2-pyridylthio)tin(IV) in a yield of 98.0% as well as hydrochloride of the employed base. (Refer to Referential Example 4).

The dichloro bis(2-pyridylthio)tin(IV) obtained by these methods precisely agreed with the aforementioned crystals in their melting points and IR spectra. Accordingly, the aforementioned crystals are evidently identified as a compound having tetracovalent tin atom.

In addition, the aforementioned crystals showed, in Mass Spectra, peaks at 300, 265 and 230 which were assigned to fragments of

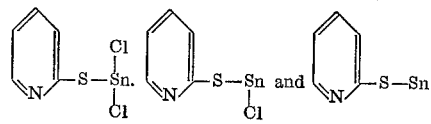

These results apparently evidence that the aforementioned crystals have the following formula which would prove an insertion of stannous chloride into the S—S bond of 2,2'-dipyridyl disulfide and oxidation of tin atom into the tetracovalent state.

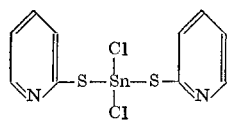

Further, treatment of the above crystals with imidazole which should have stronger coordination ability to a tin atom than 2,2'-dipyridyl disulfide did not make any change of said crystals, and the employed imidazole was recovered. (Refer to Referential Example 5) if the crystals were assumed to be identified as a complex compound with a divalent tin atom wherein 2,2'-dipyridyl disulfide merely coordinates to stannous chloride, the above-mentioned treatment causes a transfer of stannous chloride from 2,2'-dipyridyl disulfide to imidazole having stronger coordination ability (ligand exchange reaction) and therefore gives a stannous chloride complex compound of imidazole and makes 2,2'-dipyridyl disulfide free.

The fact that in coordination ability to tin atom imidazole is stronger than 2,2'-dipyridyl disulfide is proved by the experiment in which a 2,2'-dipyridyl disulfide-stannic chloride complex (1:1 in molar ratio) was treated with imidazole to give 2,2'-dipyridyl disulfide and imidazole-stannic chloride complex (2:1 in molar ratio). (Refer to Referential Examples 6 and 7). Therefore, it is also proved that the aforementioned crystals have the above-identified formula containing a tetracovalent tin atom based on the fact that the treated crystals were recovered unchanged without setting 2,2'-dipyridyl disulfide free in the reaction with imidazole.

In addition, since a tetracovalent tin atom can have a coordination number of 6, dichloro bis(2-pyridylthio)tin(IV) may have, under certain conditions, the resonance structures shown below. In this invention, said structures are typified by the aforementioned limit-structural formula.

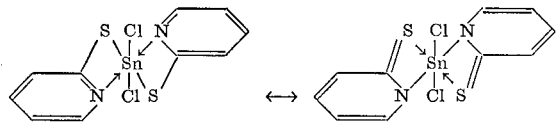

REFERENTIAL EXAMPLE 1

Synthesis of dichloro bis(2-pyridylthio)tin(IV) by the reaction of dichloro bis(acetylacetonato)tin(IV) with 2-pyridinethiol in a benzene solution.

To a solution of 3.88 g. of dichloro bis(acetylacetonato)tin(IV) in 100 ml. of benzene was added 2.22 g. of 2-pyridinethiol and the mixture was stirred at room temperature. With dissolution of crystals of 2-pyridinethiol, other crystals freshly began to precipitate. The mixture was stirred overnight at room temperature and filtered. The collected residue was washed with 50 ml. of benzene and dried to give 3.84 g. of dichloro bis(2-pyridylthio)tin(IV) as almost colorless crystals with slight yellowness. The obtained crystals had a melting point of

275~277° C.

IR spectrum thereof was superimposable on that of the crystals obtained in Synthesis Example 1.

In addition, it was ascertained by gas chromatography that the benzene filtrate separated from the crystals contained acetylacetone.

REFERENTIAL EXAMPLE 2

Synthesis of dichloro bis(2-pyridylthio)tin(IV) by the reaction of 2-pyridinethiol with stannic chloride in an aqueous solution.

To a solution of 4.44 g. of 2-pyridinethiol in 50 ml. of water was added dropwise with stirring at room temperature 30 ml. of an aqueous solution containing 7.7 g. of stannic chloride pentahydrate. With addition, crystals precipitated. After completion of the addition, stirring was continued overnight at room temperature, and the reaction mixture was filtered. The collected residue was washed with 30 ml. of cooled water and dried to give 7.40 g. of dichloro bis(2-pyridylthio)tin(IV) as almost colorless crystals with slight yellowness. The obtained crystals had a melting point of 275~277° C. IR spectrum thereof was superimposable on that of the crystals obtained in Synthesis Example 1.

REFERENTIAL EXAMPLE 3

Synthesis of 2-pyridinethiol-stannic chloride complex

To a solution of 2.67 g. of 2-pyridinethiol in 80 ml. of ethylene dichloride was added dropwise with stirring at room temperature 20 ml. of ethylene dichloride containing 3.13 g. of stannic chloride. With addition, yellow crystals began to precipitate. After the addition was completed, when a temperature of the reaction mixture rose by 5° C., stirring was continued for another 4 hours and the reaction mixture was filtered. The collected residue was washed with 30 ml. of ethylene dichloride and dried to give 5.79 g. of yellow crystals. Those crystals had a melting point of 224~226° C. and were identified as 2-pyridinethiol-stannic chloride complex (2:1 in molar ratio) by IR spectrum and the elemental analyses.

Found: C, 25.22%; H, 2.12%; N, 6.11%; S, 13.34%; Cl, 29.10%. Calcd. for $C_{10}H_{10}N_2S_2SnCl_4$: C, 24.87%; H, 2.09%; N, 5.80%; S, 13.28%; Cl, 29.37%.

REFERENTIAL EXAMPLE 4

Synthesis of dichloro bis(2-pyridylthio)tin(IV) by the reaction of 2-pyridinethiol-stannic chloride complex with triethylenediamine.

To 120 ml. of benzene was added 12.07 g. of 2-pyridinethiol-stannic chloride complex (2:1 in molar ratio) and the mixture was stirred. To the suspension was added dropwise at room temperature a solution of 2.81 g. of triethylenediamine in 30 ml. of benzene. A slightly exothermic reaction occurred upon the addition, and a temperature of the reaction mixture rose by 6° C. when the addition was completed. After the completion of the addition, the mixture was stirred at room temperature for 18 minutes and then refluxed by heating for 2 hours. After termination of the heating, stirring was continued for another 2 hours. The reaction mixture was filtered to give 14.69 g. of crystals. The obtained crystals were identified as a mixture of those of dichloro bis(2-pyridylthio)tin(IV) and those of triethylenediamine dihydrochloride by the IR spectrum.

These crystals were then added to 50 ml. of ice-water. By stirring for ten minutes, the triethylenediamine dihydrochloride was dissolved. After filtration of this aqueous mixture, collected crystals were washed with three 10 ml. portions of cooled water and dried to give 10.04 g. of almost colorless crystals with slight yellowness. The obtained crystals had a melting point of 274~276° C. IR spectrum thereof was superimposable on that of the crystals obtained in Synthesis Example 1.

REFERENTIAL EXAMPLE 5

Influence of imidazole on dichloro bis(2-pyridylthio)tin(IV)

To a solution of 1.36 g. of imidazole in 60 ml. of isopropanol was added 4.10 g. of dichloro bis(2-pyridylthio)tin(IV). The mixture was stirred at room temperature for 5 hours and then filtered. The collected residue was washed with 50 ml. of isopropanol and dried to give 3.85 g. of crystals. The obtained crystals had a melting point of 275~276° C. IR spectrum thereof was superimposable on that of dichloro bis(2-pyridylthio)tin(IV) firstly used in this Referential example. The combined filtrate and washings were concentrated under reduced pressure, whereby imidazole was quantitatively recovered.

REFERENTIAL EXAMPLE 6

Synthesis of 2,2'-dipyridyl disulfide-stannic chloride complex

To a solution of 2.20 g. of 2,2'-dipyridyl disulfide dissolved in 30 ml. of benzene was added dropwise at room temperature a solution of 2.61 g. of stannic chloride in 20 ml. of benzene. A slightly exothermic reaction occurred upon the addition and a temperature of the reaction mixture rose by 6° C. After completion of the addition, stirring was continued at room temperature for 5 hours. The reaction mixture was filtered, and the collected residue was dried to give 4.38 g. of yellow crystals. The crystals had a melting point of 98–101° C. and were identified as 2,2'-dipyridyl disulfide-stannic chloride complex (1:1 in molar ratio) by IR spectrum and the elemental analyses.

Found: C, 25.53%; H, 1.91%; N, 5.73%; S, 13.05%; Cl, 29.35%. Calcd. for $C_{10}H_8N_2S_2SnCl_4$: C, 24.98%; H, 1.68%; N, 5.83%; S, 13.34%; Cl, 29.50%.

REFERENTIAL EXAMPLE 7

Reaction of 2,2'-dipyridyl disulfide-stannic chloride complex with imidazole

To 100 ml. of ethylene dichloride were added 4.81 g. of 2,2'-dipyridyl disulfide-stannic chloride complex and then 1.36 g. of imidazole, and the mixture was stirred at room temperature. Crystals of imidazole dissolved and other crystals newly precipitated. After stirring for 5 hours, the reaction mixture was filtered and the collected residue was dried to give 3.96 g. of colorless crystals. In determination of a melting point, the crystals began to sinter with coloration of black at 286° C. and completely decomposed at 322° C. The obtained substance was identified by IR spectrum as imidazole-stannic chloride complex (2:1 in molar ratio) which was synthesized separately from 2 moles of imidazole and 1 mole of stannic chloride.

In addition, the filtrate obtained by the filtration leaving 3.96 g. of the above-mentioned colorless crystals was concentrated and ethylene dichloride was recovered. The residue was washed with 60 ml. of water to give 2.16 g. of 2,2'-dipyridyl disulfide as water-insoluble crystals. The relative recovery of the disulfide was 98.2% based on the 2,2'-dipyridyl disulfide-stannic chloride complex employed.

SYNTHESIS EXAMPLE 2

Synthesis of dibromo bis(2-pyridylthio)tin(IV)

To 50 ml. of ethylene dichloride was added 5.38 g. of stannous bromide monohydrate. To the stirred mixture was added dropwise at room temperature a solution of 4.00 g. of 2,2'-dipyridyl disulfide in 50 ml. of ethylene dichloride. A slightly exothermic reaction occurred and a temperature of the reaction mixture rose by 2–3° C. The crystals of stannous bromide monohydrate gradually dissolved and yellow crystals begin to precipitate. After completion of the addition, stirring was continued at room temperature for 5 hours. The reaction mixture was filtered and the collected residue was dried to give 7.32 g. of yellow crystals. The obtained crystals had a melting point of 278–280° C. and were identified by IR spectrum and the elemental analyses as dibromo bis(2-pyridylthio)tin(IV).

Found: C, 24.30%; H, 1.66%; N, 5.62%; S, 12.78%. Calcd. for $C_{10}H_8N_2S_2SnBr_2$: C, 24.08%; H, 1.62%; N, 5.62%; S, 12.85%.

SYNTHESIS EXAMPLE 3

Synthesis of dichloro bis(3-cyano-4,6-dimethyl-2-pyridylthio)tin(IV)

To a solution of 2.39 g. of ε-caprolactam and 2.84 g. of stannous chloride in 40 ml. of benzene was added dropwise with stirring at room temperature a solution of 4.90 g. of bis(3-cyano-4,6-dimethyl-2-pyridyl) disulfide in 90 ml. of benzene. There was no noticeable change of the temperature of the mixture during the addition and the reaction mixture remained in homogeneous state. After a few minutes upon completion of addition, pale-yellow crystals began to precipitate. The resultant mixture was stirred for 1 hour after the completion of the addition, and the reaction mixture was filtered. The collected residue was dried to give 5.71 g. of pale-yellow crystals. The crystals were recrystallized from ethylene dichloride, m.p. 259–260° C. (decomp.). The recrystallized crystals were identified by the elemental analyses and IR spectrum as dichloro bis(3-cyano-4,6-dimethyl-2-pyridylthio)tin(IV).

Found: C, 37.29%; H, 2.72%; N, 10.87%; S, 12.29%; Cl, 14.15%. Calcd. for $C_{16}H_{14}N_4S_2SnCl_2$: C, 37.24%; H, 2.75%; N, 10.86%; S, 12.43%; Cl, 13.74%.

The solution obtained by filtration leaving the above-mentioned crystals was concentrated, whereby benzene was recovered. The residue was washed with 40 ml. of carbon tetrachloride and then 30 ml. of ethylene dichloride and dried to give 1.23 g. of pale-yellow crystals. It was confirmed by the IR spectrum and a melting point determination that the obtained crystals should be identified as dichloro bis(3-cyano-4,6-dimethyl - 2 - pyridylthio)tin(IV).

SYNTHESIS EXAMPLE 4

Synthesis of dichloro bis(3-cyano-4-methyl-6-phenyl-2-pyridylthio)tin(IV)

To a suspension of 100 ml. of benzene containing 2.78 g. of bis(3-cyano-4-methyl-6-phenyl-2-pyridyl) disulfide (a synthetic method thereof is referred to Referential Example 8) was added dropwise with stirring at room temperature a solution of 1.40 g. of ε-caprolactam and 1.17 g. of stannous chloride in 30 ml. of benzene. A slightly exothermic reaction occurred and a temperature of the reaction mixture rose by 1~2° C. The reaction mixture was gradually becoming orange-yellow and, with gradual dissolution of the crystals of the above-mentioned disulfide, there began to precipitate new crystals. After stirring the mixture overnight at room temperature, the reaction mixture was filtered. The collected residue was dried to give 3.46 g. of yellowish crystals. The obtained crystals were recrystallized from benzene. In determination of a melting point, the crystals decomposed at 304~305° C. The crystals were identified by the elemental analyses and IR spectrum as dichloro bis(3-cyano-4-methyl-6-phenyl-2-pyridylthio)tin(IV).

Found: C, 49.40%; H, 2.93%; N, 8.72%; S, 10.12%; Cl, 10.87%. Calcd. for $C_{26}H_{18}N_4S_2Cl_2$: C, 48.79%; H, 2.83%; N, 8.75%; S, 10.02%; Cl, 11.08%.

REFERENTIAL EXAMPLE 8

Synthesis of bis(3-cyano-4-methyl-6-phenyl-2-pyridyl) disulfide

An ethanolic solution containing sodium ethoxide was prepared by dissolving 0.74 g. of metallic sodium in 70 ml. of ethanol. To the solution was added 7.28 g. of 3-cyano-4-methyl-6-phenyl-2-pyridinethiol. The mixture was stirred at room temperature for about 20 minutes to give a yellowish homogeneous solution. To this solution was added dropwise with stirring at room temperature 60 ml. of ethanol containing 4.09 g. of iodine. With addition, colorless crystals began to precipitate and there was obtained a suspension at the time of completion of the addition. After completion of the addition, stirring was continued for about 2 hours at room temperature. The reaction mixture was then filtered and the collected residue was dried to give 7.00 g. of brownish crystals. The obtained crystals were recrystallized from benzene. The crystals recrystallized had a melting point of 200–201° C. and were identified by the elemental analyses and IR spectrum as bis(3-cyano-4-methyl - 6 - phenyl-2-pyridyl) disulfide.

Found: C, 69.46%; H, 3.70%; N, 12.65%; S, 14.16%. Calcd. for $C_{26}H_{18}N_4S_2$: C, 69.31%; H, 4.02%; N, 12.43%; S, 14.23%.

SYNTHESIS EXAMPLE 5

Synthesis of dichloro bis(N-oxido-2-pyridylthio)tin(IV)

To a suspension of 80 ml. of ethylene dichloride containing 4.00 g. of bis(N-oxido-2-pyridyl) disulfide was added dropwise with stirring at room temperature a solution of 3.59 g. of ε-caprolactam and 3.01 g. of stannous chloride in 50 ml. of ethylene dichloride. A slightly exothermic reaction occurred and a temperature of the reaction mixture rose by 3° C. With addition, said disulfide gradually dissolved and there began to precipitate newly colorless crystals. After completion of the addition, the resultant mixture was refluxed by heating with stirring for 45 minutes. After spontaneous cooling, the reaction mixture was filtered. The collected residue was washed with 20 ml. of ethylene dichloride and dried to give 6.52 g. of colorless crystals. The obtained crystals had a melting point of 300.5~302° C. (decomp.) and were identified by IR spectrum and the elemental analyses as dichloro bis(N-oxido-2-pyridylthio)tin(IV).

Found: C, 27.13%; H, 1.78%; N, 6.25%; S, 14.10%; Cl, 16.33%. Calcd. for $C_{10}H_8N_2O_2S_2SnCl_2$: C, 27.18%; H, 1.82%; N, 6.34%; S, 14.51%; Cl, 16.05%.

Since both the filtrate obtained by filtration leaving 6.52 g. of the above colorless crystals and the washing solution contained ε-caprolactam and a small quantity of dichloro bis(N-oxido-2-pyridylthio)tin(IV), these solutions were used for a repeated reaction. To a solution made by combining said filtrate and washing solution 3.01 g. of stannous chloride was added and was stirred at room temperature. To the resultant clear solution was added 4.00 g. of bis(N-oxido-2-pyridyl) disulfide and the mixture was refluxed by heating with stirring for 1 hour. After spontaneous cooling, the reaction mixture was filtered. The collected residue was washed with 20 ml. of ethylene dichloride and dried to give 6.95 g. of colorless crystals. The obtained crystals had a melting point of 300.5~302° C. (decomp.). In addition, IR spectrum of the crystals was superimposable on that of the crystals obtained, in 6.52 g. yield, by the reaction above mentioned. From these results, the obtained crystals were also identified as dichloro bis(N-oxido-2-pyridylthio)tin(IV).

SYNTHESIS EXAMPLE 6

Synthesis of dichloro bis(4,6-dimethyl-2-pyridylthio)tin(IV)

To 50 ml. of a benzene solution containing 5.00 g. of bis(4,6-dimethyl-2-pyridyl) disulfide (the synthetic method is referred to Referential Examples 9 and 10) was added dropwise with stirring a solution of 4.09 g. of ε-caprolactam and 3.43 g. of stannous chloride in 55 ml. of benzene. A slightly exothermic reaction occurred upon addition and a temperature of the reaction mixture rose by 5~6° C. The reaction mixture remained as a homogeneous solution. After stirring for about 30 minutes from the completion of the addition, there began to precipitate crystals. Stirring was continued overnight and the reaction mixture was filtered. The collected residue was dried to give 4.66 g. of yellowish crystals. The crystals were recrystallized from acetonitrile. The obtained crystals had a melting point of 198~201° C. and were identified by the elemental analyses and IR spectrum as dichloro bis-(4,6-dimethyl-2-pyridylthio)tin(IV).

Found: C, 36.06%; H, 3.40%; N, 6.19%; S, 13.47%; Cl, 15.04%. Calcd. for $C_{14}H_{16}N_2S_2SnCl_2$: C, 36.08%; H, 3.46%; N, 6.01%; S, 13.76%; Cl, 15.22%.

Benzene was recovered by concentration of the benzene solution obtained by filtration leaving 4.66 g. of the above yellowish crystals, and the obtained residue was washed with 40 ml. of carbon tetrachloride and further with 50 ml. of acetonitrile to give 2.81 g. of yellowish crystals. The obtained crystals were identified by their melting points and IR spectrum as dichloro bis(4,6-dimethyl-2-pyridylthio)tin(IV).

REFERENTIAL EXAMPLE 9

Synthesis of 4,6-dimethyl-2-pyridinethiol

To 250 ml. of an aqueous solution of 48% hydrobromic acid was added 48.21 g. of 3-cyano-4,6-dimethyl-2-pyridinethiol and the mixture was refluxed by heating for 4 hours. During the reflux, the mixture remained as a homogeneous solution. After termination of heating, however, lowering of the temperature caused to precipitate crystals. After cooling to room temperature, the mixture was filtered leaving yellowish crystals. The obtained crystals were recrystallized from 1700 ml. of ethanol to give 9.31 g. of fine pale-yellow prisms. In determination of a melting point, the prisms decomposed at 253–254° C. The prisms were identified by the elemental analyses and IR spectrum (an absorption appeared at 1670 cm.$^{-1}$, which is due to carboxylic acid) as 3-carboxy-4,6-dimethyl-2-pyridinethiol.

Found: C, 52.40%; H, 4.99%; N, 7.57%; S, 17.70%. Calcd. for $C_8H_9NO_2S$: C, 52.44%; H, 4.95%; N, 7.64%; S, 17.50%.

Further, the above aqueous hydrobromic acid obtained by the filtration leaving the above yellowish crystals was diluted with 1500 ml. of water and allowed to stand overnight at room temperature to precipitate crystals. The mixture was filtered and the obtained residue was dried to give 11.64 g. of yellow crystals. The crystals were recrystallized from 800 ml. of acetonitrile and dried to give 7.50 g. of yellowish prisms. The obtained prisms had a melting point of 239~241° C. and were identified by the elemental analyses and IR spectrum as 4,6-dimethyl-2-pyridinethiol.

Found: C, 60.42%; H, 6.52%; N, 10.18%; S, 22.74%. Calcd. for $C_7H_9NS$: C, 60.39%; H, 6.52%; N, 10.06%; S, 23.03%.

Said compound can be also synthesized by decarboxylation of 3-carboxy-4,6-dimethyl-2-pyridinethiol.

REFERENTIAL EXAMPLE 10

Synthesis of bis(4,6-dimethyl-2-pyridyl) disulfide

An ethanolic solution containing sodium ethoxide was prepared by dissolving 1.11 g. of metallic sodium in 60 ml. of ethanol. To this solution was added 6.74 g. of 4,6-dimethyl-2-pyridinethiol which was prepared in Referential Example 9. The mixture was stirred at room temperature to yield a homogeneous solution. To the resulting solution was added dropwise with stirring at room temperature a solution of 6.14 g. of iodine in 55 ml. of ethanol. After completion of the addition, the reaction mixture was further stirred at room temperature for 1 hour and then concentrated under reduced pressure to recover ethanol. To the residue was added 60 ml. of water and the mixture was stirred and filtered leaving insoluble materials. The collected materials were air-dried and dissolved in 55 ml. of methanol. By gradual addition of 110 ml. of water, the solution gave a precipitate, which was collected by filtration and dried to yield 6.03 g. of colorless crystals. The obtained crystals had a melting point of 84.5~85.0° C. and were identified by the elemental analyses and IR spectrum as bis(4,6-dimethyl-2-pyridyl) disulfide.

Found: C, 60.83%; H, 5.93%; N, 10.19%; S, 23.04%. Calcd. for $C_{14}H_{16}N_2S_2$: C, 60.83%; H, 5.83%; N, 10.13%; S, 23.20%.

SYNTHESIS EXAMPLE 7

Synthesis of dichloro bis(4-methyl-6-phenyl-2-pyridylthio)tin(IV)

To a suspension of 50 ml. of benzene containing 4.0 g. of bis(4-methyl-6-phenyl-2-pyridyl) disulfide (the synthetic method is referred to Referential Examples 11 and 12) was added dropwise with stirring at room temperature a solution of 2.26 g. of ε-caprolactam and 1.88 g. of stannous chloride in 30 ml. of benzene. The reaction mixture became a yellow homogeneous solution when an about half of the solution was added. A slightly exothermic reaction occurred and, when the addition was completed, a temperature of the reaction mixture rose by 3° C. After stirring for about 20 minutes from completion of the addition, there began to precipitate yellow crystals. After additional stirring overnight, the reaction mixture was filtered. The collected residue was dried to give 4.18 g. of yellow crystals, which were recrystallized from acetonitrile. The obtained crystals had a melting point of 210° C. and were identified by the elemental analyses and IR spectrum as dichloro bis(4-methyl-6-phenyl-2-pyridylthio)tin(IV).

Found: C, 48.76%; H, 3.36%; N, 4.97%; S, 10.66%; Cl, 11.77%. Calcd. for $C_{24}H_{20}N_2S_2SnCl_2$: C, 48.85%; H, 3.42%; N, 4.75%; S, 10.87%; Cl, 12.07%.

The benzene solution obtained by filtration leaving 4.18 g. of the above yellow crystals was concentrated to recover benzene. The residue was washed with 40 ml. of carbon tetrachloride and further with 40 ml. of acetonitrile to yield 0.95 g. of yellow crystals. The obtained crystals were identified by the melting point and IR spectrum as dichloro bis(4-methyl-6-phenyl-2-pyridylthio)tin(IV).

REFERENTIAL EXAMPLE 11

Synthesis of 4-methyl-6-phenyl-2-pyridinethiol

To 300 ml. of a 48% aqueous hydrobromic acid was added 24.0 g. of 3-cyano-4-methyl-6-phenyl-2-pyridinethiol and the mixture was refluxed by heating for 4 hours. During reflux, the mixture was a homogeneous solution, but there began to precipitate crystals with spontaneous cooling. The reaction mixture was poured into 1 l. of ice-water. After stirring, the mixture was filtered leaving a mixed residue of crystals with oil. Said residue was washed with 60 ml. of ethanol and dried to yield 8.0 g. of yellowish crystals. The crystals were recrystallized from 200 ml. of a mixture of water and ethanol (3:1 in volume ratio) to give 5.13 g. of fine yellowish prisms. The obtained prisms had a melting point of 168~171° C. and were identified by the elemental analyses and IR spectrum as 4-methyl-6-phenyl-2-pyridinethiol.

Found: C, 71.40%; H, 5.26%; N, 6.80%; S, 15.31%. Calcd. for $C_{12}H_{11}NS$: C, 71.61%; H, 5.51%; N, 6.96%; S, 15.93%.

REFERENTIAL EXAMPLE 12

Synthesis of bis(4-methyl-6-phenyl-2-pyridyl) disulfide

An ethanolic solution containing sodium ethoxide was prepared by dissolving 0.57 g. of metallic sodium in 40 ml. of ethanol. To this solution was added 5.00 g. of 4-methyl-6-phenyl-2-pyridinethiol and the mixture was stirred at room temperature. To the obtained yellow-orange suspension was added dropwise with stirring at room temperature a solution of 3.16 g. of iodine in 40 ml. of ethanol. With addition, the suspended yellow-orange material was dissolved and simultaneously colorless crystals newly began to crystallize out. After completion of the addition, stirring was continued at room temperature for 3 hours and the reaction mixture was filtered. The collected residue was dried to yield 4.0 g. of colorless powdery crystals. The obtained crystals had a melting point of 154° C. and were identified by the elemental analyses and IR spectrum as bis(4-methyl-6-phenyl-2-pyridyl) disulfide.

Found: C, 71.45%; H, 4.78%; N, 6.95%; S, 15.48%. Calcd. for $C_{24}H_{20}N_2S_2$: C, 71.97%; H, 5.03%; N, 6.99%; S, 16.01%.

SYNTHESIS EXAMPLE 8

Synthesis of dichloro bis(5-nitro-2-pyridylthio)tin(IV)

A solution of 0.85 g. of ε-caprolactam and 0.71 g. of stannous chloride in 30 ml. of benzene was added dropwise with stirring at room temperature to 60 ml. of benzene solution containing 1.17 g. of bis(5-nitro-2-pyridyl) disulfide. The resultant mixture was a yellow-orange homogeneous solution. The solution was stirred at room temperature for 30 minutes and concentrated under reduced pressure to remove benzene. To the obtained oily residue was added 100 ml. of carbon tetrachloride and the mixture was stirred. Decantation was conducted to remove carbon tetrachloride. The obtained caramel-like substance being insoluble in carbon tetrachloride was, after addition of 60 ml. of isopropanol, stirred to crystallize gradually. The crystals were collected by filtration and dried to yield 1.26 g. of yellowish crystals, having a melting point of 188–197° C. The crystals were recrystallized from acetonitrile and identified by the elemental analyses and IR spectrum as dichloro bis(5-nitro-2-pyridylthio)tin(IV). M.P. 260–262° C. (decomp.).

Found: C, 24.33%; H, 1.30%; N, 11.38%; S, 13.07%; Cl, 14.14%. Calcd. for $C_{10}H_6N_4O_4S_2SnCl_2$: C, 24.03%; H, 1.20%; N, 11.21%; S, 12.83%; Cl, 14.18%.

SYNTHESIS EXAMPLE 9

Synthesis of dichloro bis(3-ethoxycarbonyl-6-methyl-2-pyridylthio)tin(IV)

A solution of 2.20 g. of ε-caprolactam and 1.85 g. of stannous chloride in 40 ml. of benzene was added dropwise to a suspension of 50 ml. of benzene containing 3.82 g. of bis(3-ethoxycarbonyl - 6 - methyl-2-pyridyl) disulfide (the synthetic method is referred to Referential Examples 13 and 14). With addition, the suspended material gradually dissolved and, when the addition was completed, there was obtained a homogeneous solution. After stirring for 2 hours and a half at room temperature, benzene was removed from the reaction mixture. The obtained oily residue was, after addition of 100 ml. of carbon tetrachloride, stirred to crystallize gradually. The mixture became to a suspension of colorless crystals after 30 minutes. After filtration, the collected residue was dried to yield 4.76 g. of colorless crystals. The crystals were recrystallized from 80 ml. of ethanol to give 3.37 g. of colorless needles. The obtained needles had a melting point of 165.5–166° C. and were identified by the elemental analyses and IR spectrum as dichloro bis(3-ethoxycarbonyl-6-methyl-2-pyridylthio)tin(IV).

Found: C, 37.20%; H, 3.37%; N, 4.96%; S, 11.09%; Cl, 12.37%. Calcd. for $C_{18}H_{20}N_2O_4S_2SnCl_2$: C, 37.14%; H, 3.46%; N, 4.81%; S, 11.02%; Cl, 12.18%.

REFERENTIAL EXAMPLE 13

Synthesis of 3-ethoxycarbonyl-6-methyl-2-pyridinethiol

To 200 ml. of ethanol was added 14.44 g. of 3-carboxy-6-methyl-2-pyridinethiol, and the mixture was refluxed by heating for 5 hours during which dry hydrogen chloride gas was introduced into the mixture through a capillary. During reflux, the reaction mixture is a homogeneous solution. But, while stirring was continued after termination of reflux, there began to precipitate crystals. The reaction mixture was allowed to stand overnight and filtered leaving 9.60 g. of crystals. The crystals were dissolved in 80 ml. of water and neutralized with a 10% aqueous sodium hydrogen carbonate. The precipitated crystals were collected by filtration and recrystallized from 1500 ml. of isopropyl ether to give 5.41 g. of pale-yellow prisms. The prisms had a melting point of 129–131° C. and were identified by the elemental analyses and IR spectrum as 3-ethoxycarbonyl-6-methyl-2-pyridinethiol.

Found: C, 54.69%; H, 5.40%; N, 7.11%; S, 16.23%. Calcd. for $C_9H_{11}NO_2S$: C, 54.80%; H, 5.62%; N, 7.10%; S, 16.22%.

REFERENTIAL EXAMPLE 14

Synthesis of bis(3-ethoxycarbonyl-6-methyl-2-pyridyl) disulfide

An ethanolic solution containing sodium ethoxide was prepared by dissolving 0.63 g. of metallic sodium in 80 ml. of ethanol. To this solution was added 5.35 g. of 3-ethoxycarbonyl-6-methyl-2-pyridinethiol, and the mixture was stirred to give a yellowish homogeneous solution. To the solution was added dropwise with stirring at room temperature 40 ml. of ethanol containing 3.45 g. of iodine. With addition, there began to precipitate colorless crystals. After completion of the addition, stirring was continued for 30 minutes at room temperature, and the reaction mixture was filtered. The collected residue was dried to yield 5.1 g. of colorless crystals. The crystals were recrystallized from 35 ml. of carbon tetrachloride to give 3.95 g. of colorless prisms. The obtained crystals had a melting point of 138–140° C. and were identified by the elemental analyses and IR spectrum a bis(3-ethoxycarbonyl-6-methyl-2-pyridyl) disulfide.

Found: C, 54.88%; H, 5.06%; N, 7.31%; S, 16.4%. Calcd. for $C_{18}H_{20}N_2O_4S_2$: C, 55.08%; H, 5.14%; N, 7.14%; S, 16.34%.

SYNTHESIS EXAMPLE 10

Synthesis of dichloro bis(3-cyano-6-methyl-2-pyridylthio)tin(IV)

A solution of 3.79 g. of ε-caprolactam and 3.18 g. of stannous chloride in 90 ml. of benzene was added dropwise with stirring at room temperature to a suspension comprising 70 ml. of benzene and 5.0 g. of bis(3-cyano-6-methyl-2-pyridyl) disulfide (a synthetic method is referred to Referential Example 15). With addition, a slightly exothermic reaction occurred, and a temperature of the reaction mixture rose by 2° C., and crystals newly precipitated. After completion of the addition, the mixture was stirred at room temperature for 1 hour and refluxed by heating for 1 hour. The reaction mixture was left to reach room temperature and filtered. The collected residue was dried to yield 6.36 g. of yellowish crystals. The crystals were recrystallized from acetonitrile to give yellowish prisms. The obtained prisms had a melting point of 262–265° C. (decomp.) and were identified by the elemental analyses and IR spectrum as dichloro bis(3-cyano-6-methyl-2-pyridylthio)tin(IV).

Found: C, 34.79%; H, 2.13%; N, 11.95%; S, 13.38%; Cl, 14.30%. Calcd. for $C_{14}H_{10}N_4S_2SnCl_2$: C, 34.47%; H, 2.07%; N, 11.48%; S, 13.14%; Cl, 14.53%.

REFERENTIAL EXAMPLE 15

Synthesis of bis(3-cyano-6-methyl-2-pyridyl) disulfide

An ethanolic solution containing sodium ethoxide was prepared by dissolving 1.91 g. of metallic sodium in 80 ml. of ethanol. To this solution was added 12.47 g. of 3-cyano-6-methyl-2-pyridinethiol, and the mixture was stirred at room temperature for a few minutes to give a homogeneous solution. To the solution was added dropwise with stirring at room temperature 100 ml. of an ethanolic solution containing 10.54 g. of iodine. In a few minutes after completion of the addition, there began to precipitate crystals. The mixture was stirred for 1 hour and a half, and then filtered. The collected residue was dried to yield 9.93 g. of pale yellow-brown crystals. The crystals were recrystallized from 800 ml. of isopropanol to give 8.47 g. of pale yellow-brown prisms. The obtained prisms had a melting point of 172–173° C. and were identified by the elemental analyses and IR spectrum as bis(3-cyano-6-methyl-2-pyridyl) disulfide.

Found: C, 56.47%; H, 3.43%; N, 18.29%; S, 21.99%. Calcd. for $C_{14}H_{10}N_4S_2$: C, 56.36%; 3.38%; N, 18.78%; S, 21.49%.

SYNTHESIS EXAMPLE 11

Synthesis of diiodo bis(2-pyridylthio)tin(IV)

To a stirred suspension of 7.95 g. of stannous iodide (purity: 85%) in 40 ml. of ethylene dichloride was added dropwise at room temperature a solution of 4.00 g. of 2,2'-dipyridyl disulfide in 60 ml. of ethylene dichloride. With addition, suspended red-orange stannous iodide gradually dissolved and yellow-orange crystals newly began to precipitate. A slightly exothermic reaction occurred and a temperature of the reaction mixture rose by 3° C. After completion of the addition, the mixture was stirred at room temperature for 3 hours and filtered. The collected residue was dried to give 9.05 g. of yellow-orange crystals. Crystals recrystallized from ethylene dichloride and a melting point of 271–273° C. and were identified by the elemental analyses and IR spectrum as diiodo bis(2-pyridylthio)tin(IV).

Found: C, 20.18%; H, 1.24%; N, 4.95%; S, 10.63%; I, 43.09%. Calcd. for $C_{10}H_8N_2S_2SnI_2$: C, 20.26%; H, 1.36%; N, 4.73%; S, 10.82%; I, 42.81%.

Examples and comparative examples will be illustrated below. The term "part" means weight part and Melt Flow Index (M. I.) was determined in accordance with ASTMD 1238. In addition, the notations shown in Tables mean the following anti-deteriorating agents and anti-oxidizing agents.

A. Dichloro bis(2-pyridylthio)tin(IV)
B. Dibromo bis(2-pyridylthio)tin(IV)
C. Dichloro bis(3-cyano-4,6-dimethyl-2-pyridylthio)-tin(IV)
D. Dichloro bis(3-cyano-4-methyl-6-phenyl-2-pyridylthio)tin(IV)
E. Dichloro bis(N-oxido-2-pyridylthio)tin(IV)
F. Dicholo bis(4,6-dimethyl-2-pyridylthio)tin(IV)
G. Dichloro bis(4-methyl-6-phenyl-2-pyridylthio)tin(IV)
H. Dichloro bis(5-nitro-2-pyridylthio)tin(IV)
I. Dichloro bis(3-ethoxycarbonyl-6-methyl-2-pyridylthio)-tin(IV)
J. Dichloro bis(3-cyano-6-methyl-2-pyridylthio)tin(IV)
K. Diiodo bis(2-pyridylthio)tin(IV)
a. MARK-CDA-1 (trade name, available from Adeka-Argus Chemical Industry Co., Ltd.)
b. N,N'-Dibenzylideneoxalic acid dihydrazide (trade name; Eastman inhibitor-OABH, available from Eastman-Kodak Co., Ltd.)
c. N-Salicylidenesalicylic acid hydrazide (trade name; Chel-180, available from Chiba-Geigy Ltd.)
d. Tetrakis [3-(3,5-di-tert-butyl-4-hydroxyphenyl)-propionyloxymethyl]methane
e. Mark-CDA-3 (trade name, available from Adeka-Argus Chemical Industry Co., Ltd.)

EXAMPLES 1–22

(1) Preparation of test piece.—Into Brabender plastograph (available from Brabender Corporation, West Germany) adjusted to 60 r.p.m. of rotation speed and a temperature of 140° C. were charged 100 parts of ethylene homopolymer (M.I.=0.2) with no additives prepared by a high pressure process. Two minutes later, 0.10 part of an antioxidant, tetrakis[3-(3,5-di-tert-butyl-4-hydroxyphenyl)-propionyloxymethyl]methane, and a fixed amount of the anti-deteriorating agent was added thereto. Further, another 2 minutes later, 0.10 part of copper stearate was added to the mixture, which was subsequently kneaded for 8 minutes. The mixture was then heated on a plate of 190° C. for 1 minute and was pressed at a pressure of 300 kg./cm.$^2$ for 1 minute by means of the spacer to form a film having a thickness of 0.25 mm. A round film of 4 mm. in its diameter was prepared by punching of the obtained film, and employed as a test piece.

(2) Determination of anti-deterioration effect.—The time required for appearance of a peak showing generation of heat caused by oxidation was determined by means of Standard-Type Rapidly Fluctuating Differential Calorimeter (available from Rigaku Denki Kogyo Ltd., Japan). The calorimeter received a test piece in one example dish and the other dish remained empty. After the atmosphere of the calorimeter was replaced with oxygen, the environmental temperature was elevated to 195° C. in an instant (about 5–10 seconds) by means of an inside heating system, then elevated to 200° C. in about 30 seconds and kept at this temperature, during which process oxygen was made to flow therethrough at a rate of 180 ml./min. The induction period herein means the periods from the time when the temperature rose to 200° C. to the time when there appeared a peak showing generation of heat caused by oxidation of a test piece. The period determined as above was adopted to estimate an anti-deterioration effect.

The results obtained according to the above-mentioned process are shown in Table 1.

TABLE 1

| Example | Kind and amount (part), of compound | | Induction period (min.) |
|---|---|---|---|
| 1 | A | 0.05 | 17 |
| 2 | A | 0.10 | 35 |
| 3 | A | 0.05 | 65 |
| 4 | B | 0.15 | 70 |
| 5 | C | 0.15 | 50 |
| 6 | D | 0.15 | 51 |
| 7 | E | 0.05 | 21 |
| 8 | E | 0.10 | 54 |
| 9 | E | 0.15 | 114 |
| 10 | E | 0.50 | 186 |
| 11 | F | 0.05 | 35 |
| 12 | F | 0.10 | 74 |
| 13 | F | 0.15 | 140 |
| 14 | F | 0.50 | 210 |
| 15 | G | 0.05 | 38 |
| 16 | G | 0.10 | 78 |
| 17 | G | 0.15 | 140 |
| 18 | G | 0.50 | 215 |
| 19 | H | 0.15 | 76 |
| 20 | I | 0.15 | 72 |
| 21 | J | 0.15 | 53 |
| 22 | K | 0.15 | 80 |

COMPARATIVE EXAMPLES 1–7

Test pieces were prepared by the method described in Example 1 except using no anti-deteriorating agent of this invention and copper stearate, using no anti-deteriorating agent only or using the known anti-deteriorating agents in an amount shown in Table 2 instead of the anti-deteriorating agents of this invention. Their effects were determined in the manner described in Example 1 and their results are shown in Table 2.

TABLE 2

| Comparative example | Kind and amount (part), of anti-deteriorating agent | | Amount of copper stearate (part) | Induction period (min.) |
|---|---|---|---|---|
| 1 | | | | 39 |
| 2 | | | 0.10 | 0 |
| 3 | a | 0.05 | 0.10 | 10 |
| 4 | a | 0.10 | 0.10 | 20 |
| 5 | a | 0.15 | 0.10 | 34 |
| 6 | b | 0.15 | 0.10 | 36 |
| 7 | c | 0.15 | 0.10 | 40 |

EXAMPLES 23–43

(1) Preparation of test piece.—Into Brabender plastograph referred to the above Example 1 and adjusted to 50 r.p.m. of rotation speed and a temperature of 200° C. were charged 100 parts of isotactic polypropylene (M.I. =1) with no additives. Two minutes later, 0.60 part of tetrakis[3 - (3,5 - di - tert - butyl - 4 - hydroxyphenyl)-propionyloxymethyl]methane, and the kind and an amount of the anti-deteriorating agent shown in Table 3 were added thereto, and the mixture was subsequently kneaded for 8 minutes. The mixture was then heated on a plate of 190° C. for 1 minute and was pressed at a pressure of 300 kg./cm.² for 1 minute by means of the spacer to form a film having a thickness of 0.25 mm. A round film of 6 mm. in its diameter was prepared by punching of the obtained film, and employed as a test piece.

(2) Determination of anti-deterioration effect.—The time required for appearance of a peak showing generation of heat caused by oxidation was determined by means of Differential Calorimeter (available from Parkin-Elmer Corporation). The calorimeter received a test piece in one sample dish on which a copper plate of 0.10 mm. in thickness and 6 mm. in diameter was put and the other dish with the same copper plate remained empty. After the atmosphere of the calorimeter was replaced with nitrogen, the environmental temperature was elevated to 200° C. at a rate of 8° C./min. in a stream of nitrogen at a rate of 400 ml./min. When the temperature reached 200° C., the nitrogen stream was replaced with oxygen at the same rate. The induction period herein means the period from the time of this replacement with oxygen to the time when there appeared a peak showing generation of heat caused by oxidation of a test piece. The period determined as above was adopted to estimate an anti-deterioration effect.

The results obtained according to the above-mentioned process are shown in Table 3.

TABLE 3

| Example | Kind of compound | Amount (part) | Induction period (min.) |
|---|---|---|---|
| 23 | A | 0.10 | 65 |
| 24 | A | 0.15 | 79 |
| 25 | A | 0.30 | 121 |
| 26 | B | 0.30 | 111 |
| 27 | C | 0.30 | 105 |
| 28 | D | 0.30 | 108 |
| 29 | E | 0.10 | 70 |
| 30 | E | 0.15 | 82 |
| 31 | E | 0.30 | 137 |
| 32 | F | 0.10 | 75 |
| 33 | F | 0.15 | 87 |
| 34 | F | 0.30 | 140 |
| 35 | G | 0.10 | 69 |
| 36 | G | 0.15 | 83 |
| 37 | G | 0.30 | 138 |
| 38 | H | 0.10 | 78 |
| 39 | H | 0.15 | 85 |
| 40 | H | 0.30 | 130 |
| 41 | I | 0.30 | 126 |
| 42 | J | 0.30 | 109 |
| 43 | K | 0.30 | 131 |

COMPARATIVE EXAMPLES 8–12

Test pieces were prepared by the method described in Example 23 except using no anti-deteriorating agent or using the known anti-deteriorating agents in an amount shown in Table 4 instead of the anti-deteriorating agents of this invention. Their effects were determined in the manner described in Example 23 and their results are shown in Table 4.

TABLE 4

| Comparative example | Kind of anti-deteriorating agent | Amount of anti-deteriorating agent (part) | Induction period (min.) |
|---|---|---|---|
| 8 | | | 50 |
| 9 | a | 0.3 | 44 |
| 10 | b | 0.3 | 57 |
| 11 | c | 0.3 | 73 |
| 12 | e | 0.3 | 95 |

EXAMPLE 44

Into Brabender plastograph (available from Brabender Corporation, West Germany) adjusted to 60 r.p.m. of rotation speed and a temperature of 140° C. were charged 100 parts of ethylene homopolymer (M.I.=0.2) with no additives prepared by a high pressure process. Two minutes later, 0.15 part of dichloro bis(4,6-dimethyl-2-pyridylthio)tin(IV) was added thereto, which was subsequently kneaded for 10 minutes. The mixture was then heated on a plate of 190° C. for 1 minute and was pressed at a pressure of 300 kg./cm.² for 1 minute by means of the spacer to form a film having a thickness of 0.25 mm. A round film of 4 mm. in its diameter was prepared by punching of the obtained film, and employed as a test piece. Determination of the anti-deteriorating effect was conducted in accordance with the method shown in Example 1 to give 155 min. of the induction period.

COMPARATIVE EXAMPLE 13

Determination of the anti-deteriorating effect was conducted in accordance with the method shown in Example 1 employing a test piece prepared by same procedure as described in Example 44 wherein 0.15 part of tetrakis-[3-(3,5 - di - tert - butyl-4-hydroxyphenyl)propionyloxymethyl]methane was used instead of dichloro bis(4,6-dimethyl-2-pyridylthio)tin(IV) to give 62 min. of the induction period.

What is claimed is:

1. A polyolefin composition which comprises 100 weight parts of polyolefin and 0.001~5 weight parts of a pyridinethiol-tin compound having the general formula of RS—SnX$_2$—SR' wherein each of R and R' represents a group which is selected from the class consisting of groups having the general formulae

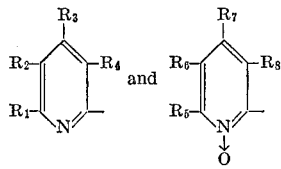
and wherein each of $R_1$–$R_8$ represents a group which is selected from the class consisting of hydrogen atom, a halogen atom, nitro group, nitroso group, an amino group, cyano group, carboxyl group, a carbamoyl group, a thiocarbamoyl group, an alkoxycarbonyl group having carbon atoms of 2–11, hydroxyl group, a hydrazinocarbonyl group, mercapto group, acyloxy, alkoxy and acylamino groups each having carbon atoms of 1–10, and a group selected from the class consisting of phenyl group and the substituted group thereof, linear and branched alkyl groups each having carbon atoms of 1–12 and the substituted groups thereof, linear and branched alkenyl groups each having carbon atoms of 2–12 and the substituted groups thereof and aralkyl and alkaryl groups each having carbon atoms of 7–12 and the substituted groups thereof wherein the substituents in the substituted groups are groups selected from the class consisting of a halogen atom and the above-mentioned groups, and not less than two groups among each of $R_1$–$R_4$ and $R_5$–$R_8$ represent groups selected from the class consisting of hydrogen atom and unsubstituted linear and branched alkyl groups each having carbon atoms of 1–12 and X represents an atom which is selected from the class consisting of fluorine, chlorine, bromine and iodine.

2. The polyolefin composition as claimed in claim 1 wherein each of R and R' of the pyridinethiol-tin compound represents a group having the general formula

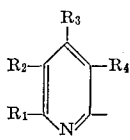

wherein each of $R_1$–$R_4$ is the same as defined in claim 1 and not less than two groups among $R_1$–$R_4$ represent groups selected from the class consisting of hydrogen atom and unsubstituted linear and branched alkyl groups each having carbon atoms of 1–12.

3. The polyolefin composition as claimed in claim 1 wherein each of R and R' of the pyridinethiol-tin compound represents a group having the general formula

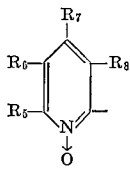

wherein each of $R_5$–$R_8$ is the same as defined in claim 1 and not less than two groups among $R_5$–$R_8$ represent groups selected from the class consisting of hydrogen atom and unsubstituted linear and branched alkyl groups each having carbon atoms of 1–12.

4. The polyolefin composition as claimed in claim 1 wherein R of the pyridinethiol-tin compound represents a group having the general formula

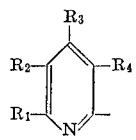

and R' thereof represents a group having the general formula

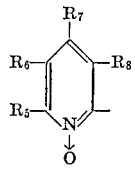

wherein each of $R_1$–$R_8$ is the same as defined in claim 1 and not less than two groups among each of $R_1$–$R_4$ and $R_5$–$R_8$ represent groups selected from the class consisting of hydrogen atom and unsubstituted linear and branched alkyl groups each having carbon atoms of 1–12.

5. The polyolefin composition as claimed in claim 2, wherein each of $R_1$–$R_4$ represents a group which is selected from the class consisting of hydrogen atom, a halogen atom, nitro group, cyano group, an alkoxycarbonyl group having carbon atoms of 2–11, an acylamino group having carbon atoms of 1–10, phenyl group which may be substituted with alkyl groups having carbon atoms of 1–4, and linear and branched alkyl groups each having carbon atoms of 1–4.

6. The polyolefin composition as claimed in claim 3, wherein each of $R_5$–$R_8$ represents a group which is selected from the class consisting of hydrogen atom, a halogen atom, nitro group and linear and branched alkyl groups each having carbon atoms of 1–4.

7. The polyolefin composition as claimed in claim 4, wherein each of $R_1$–$R_4$ represents a group which is selected from the class consisting of hydrogen atom, a halogen atom, nitro group, cyano group, an alkoxycarbonyl group having carbon atoms of 2–11, an acylamino group having carbon atoms of 1–10, phenyl group which may be substituted with alkyl groups having carbon atoms of 1–4, and linear and branched alkyl groups each having carbon atoms of 1–4, and each of $R_5$–$R_8$ represents a group which is selected from the class consisting of hydrogen atom, a halogen atom, nitro group and linear and branched alkyl groups each having carbon atoms of 1–4.

8. The polyolefin composition as claimed in claim 2, wherein each of $R_1$–$R_4$ represents a group which is selected from the class consisting of hydrogen atom, nitro group, cyano group, ethoxycarbonyl group, phenyl group and methyl group.

9. The polyolefin composition as claimed in claim 1, wherein the pyridinethiol-tin compound is one selected from the class consisting of:

dichloro bis(2-pyridylthio)tin(IV),
dibromo bis(2-pyridylthio)tin(IV),
dichloro bis(3-cyano-4,6-dimethyl-2-pyridylthio)tin (IV),
dichloro bis(3-cyano-4-methyl-6-phenyl-2-pyridylthio)tin(IV),
dichloro bis(N-oxido-2-pyridylthio)tin(IV),
dichloro bis(4,6-dimethyl-2-pyridylthio)thin(IV),
dichloro bis(4-methyl-6-phenyl-2-pyridylthio)tin(IV),
dichloro bis(5-nitro-2-pyridylthio)thin(IV),
dichloro bis(3-ethoxycarbonyl-6-methyl-2-pyridylthio)tin(IV),
dichloro bis(3-cyano-6-methyl-2-pyridylthio)tin(IV) and
diodo bis(2-pyridylthio)tin(IV).

10. The polyolefin composition as claimed in claim 1 which comprises 100 weight parts of polyolefin and 0.01~3 weight parts of the compound having the general formula of RS—SnX$_2$—SR' wherein R, R', and X are the same as defined in claim 1.

11. The polyolefin composition as claimed in claim 1 which further comprises not less than one kind of additives which are selected from the class consisting of a known stabilizing agent, dispersing agent, plasticizer, antistatic agent, filler and pigment.

12. The polyolefin composition as claimed in claim 1 wherein the polyolefin is one which is selected from the class consisting of amorphous, crystalline and liquid homopolymers and copolymers of olefins selected from the group consisting of ethylene, propylene, butene-1, isobutene, pentene-1 and 4-methyl-pentene-1, copolymers of said olefins and alkylester of unsaturated carboxylic acid selected from the group consisting of methyl acrylate, ethyl acrylate and ethyl methacrylate, copolymers of said olefins and vinyl acetate and mixtures of said polymers.

13. The polyolefin composition as claimed in claim 1 wherein the polyolefin is one which is selected from the class consisting of an ethylene homopolymer, isotactic polypropylene and ethylene-vinyl acetate copolymers.

References Cited
UNITED STATES PATENTS

| | | | |
|---|---|---|---|
| 3,723,435 | 3/1973 | Furia et al. | 260—45.75 |
| 3,310,509 | 3/1967 | Fukumoto et al. | 260—45.75 |
| 3,149,093 | 9/1964 | Hecker et al. | 260—45.75 |
| 2,888,435 | 5/1959 | Wallace | 260—45.75 |
| 3,015,644 | 1/1962 | Leistner et al. | 260—45.75 |
| 3,533,993 | 10/1970 | Hovey et al. | 260—45.75 |

V. P. HOKE, Primary Examiner

U.S. Cl. X.R.

260—45.85 B, 42.46

UNITED STATES PATENT OFFICE
CERTIFICATE OF CORRECTION

PATENT NO. : 3,850,883
DATED : November 26, 1974
INVENTOR(S) : MITSUO MASAKI et al It is certified that error appears in the above-identified patent and that said Letters Patent are hereby corrected as shown below:

Column 1, line 17: replace "comprise" with -- comprises -- .

Column 1, line 33: replace "develop" with -- developed --- .

Column 1, line 53: replace "salicylidenesalicyclic" with -- salicyclidenesalicylic -- .

Column 2, line 45: after "-fins", insert -- and -- .

Column 2, line 52: after "of", insert -- a -- .

Column 2, line 55: in the formula, replace "R-S-" with -- RS- -- .

Column 2, line 66: replace "pyridiyl" with -- pyridyl -- .

Column 3, line 44: replace "-toyl-" with --  -tolyl-  -- .

Column 6, line 38: replace "acetalacetonate" with -- acetylacetonate -- .

Column 6, line 42: replace "pyridiylthio" with -- pyridylthio -- .

Column 10, line 16: after "H" (at line 15), replace "2.75%" (at line 16) with -- 2.73% -- .

Column 15, line 13: replace "a bis(3-" with -- as bis(3-  -- .

Signed and Sealed this ninth Day of September 1975

[SEAL]

Attest:

RUTH C. MASON
Attesting Officer

C. MARSHALL DANN
Commissioner of Patents and Trademarks

PAGE TWO

UNITED STATES PATENT OFFICE
CERTIFICATE OF CORRECTION

PATENT NO. : 3,850,883
DATED : November 26, 1974
INVENTOR(S) : MITSUO MASAKI et al It is certified that error appears in the above-identified patent and that said Letters Patent are hereby corrected as shown below:

Column 15, line 15: replace "S, 16.4%" with -- S, 16.14% -- .

Column 15, line 70: after "85%", close parentheses ( -- ) -- ).

Column 16, line 5: replace "and" with -- had -- .

Column 16, line 25: replace "Dicholo" with -- Dichloro -- .

Column 16, line 67: replace "example" with -- sample -- .

Column 16, last line: replace "periods" with -- period -- .

Column 17, Table 1, Example 3: replace "0.05" with -- 0.15 -- .

Column 20, line 63: replace "thin" with -- tin -- .

Column 20, line 65: replace "thin" with -- tin -- .

Column 20, line 70: replace "diodo" with -- diiodo -- .

Column 22, line 2: replace "copolymers" with -- copolymer -- .

Signed and Sealed this ninth Day of September 1975

[SEAL]

Attest:

RUTH C. MASON
Attesting Officer

C. MARSHALL DANN
Commissioner of Patents and Trademarks